United States Patent [19]
Eckerd et al.

[11] Patent Number: 6,091,576
[45] Date of Patent: Jul. 18, 2000

[54] RAMP LOADING APPARATUS FOR A DISC DRIVE

[75] Inventors: Steve Scott Eckerd, Oklahoma City; Kenneth Lee Pottebaum, Yukon, both of Okla.

[73] Assignee: Seagate Technology, Inc., Scotts Valley, Calif.

[21] Appl. No.: 09/010,001

[22] Filed: Jan. 21, 1998

Related U.S. Application Data

[60] Provisional application No. 60/052,878, Jul. 17, 1997.

[51] Int. Cl.[7] ........................................ G11B 5/54
[52] U.S. Cl. ................................................ 360/105
[58] Field of Search .................................. 360/104–106

[56] References Cited

U.S. PATENT DOCUMENTS

| | | | |
|---|---|---|---|
| 5,204,793 | 4/1993 | Plonczak | 360/97.01 |
| 5,408,375 | 4/1995 | Asano | 360/105 |
| 5,422,770 | 6/1995 | Alt | 360/105 |
| 5,526,206 | 6/1996 | Shimizu | 360/105 |
| 5,625,514 | 4/1997 | Kubo et al. | 360/104 |
| 5,692,289 | 12/1997 | Amada et al. | 29/603.03 |
| 5,701,219 | 12/1997 | Shafe' | 360/105 |
| 5,825,576 | 10/1998 | Kamerbeek | 360/105 |
| 5,864,448 | 1/1999 | Berberich | 360/105 |
| 5,870,259 | 2/1999 | Alt et al. | 360/105 |
| 5,875,074 | 2/1999 | Ho et al. | 360/105 |
| 5,898,545 | 4/1999 | Schirle | 360/105 |

*Primary Examiner*—Jefferson Evans
*Attorney, Agent, or Firm*—Crowe & Dunlevy

[57] ABSTRACT

A ramp loading apparatus for a disc drive having a disc with a data recording surface and a controllably moveable actuator arm supporting a read/write head adjacent the data recording surface, the ramp loading apparatus having a body forming a loading ramp and a ramp stiffener attached thereto. The body has a loading tab channel associated with the lift ramp so that the read/write head can be lifted from the data recording surface of the disc during its non-operating mode. Radially extending disc snubbers extend over the outer perimeter of the disc to reduce deflection of the disc caused by the application of mechanical shock to the disc drive.

10 Claims, 5 Drawing Sheets

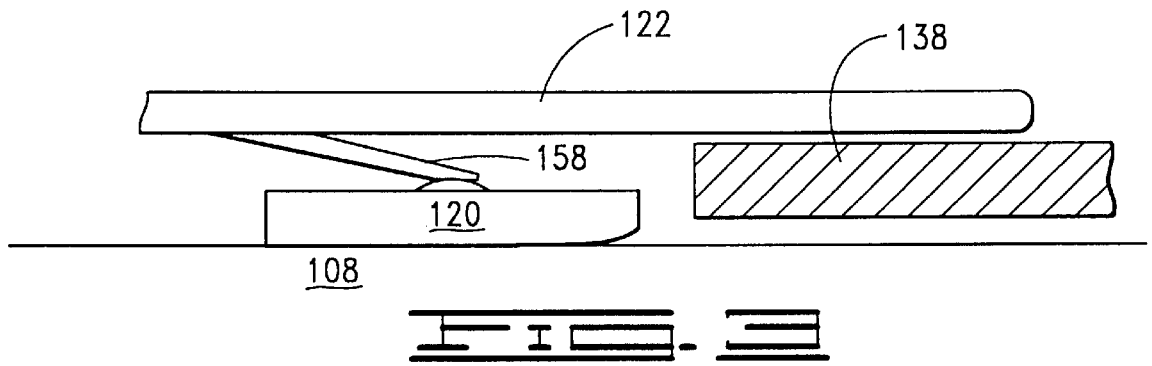
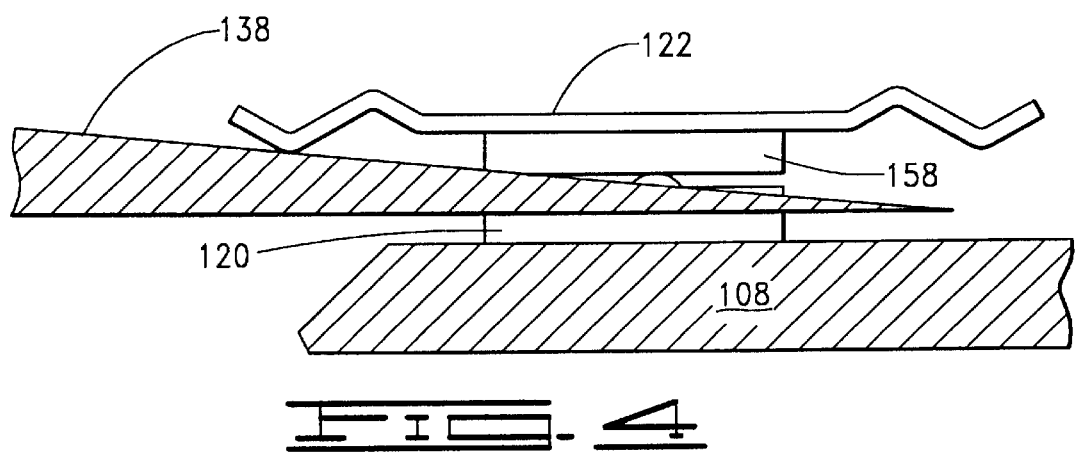

RAMP LOADING APPARATUS FOR A DISC DRIVE

This application claims the benefit of Provisional Application Ser. No. 60/052,878 entitled RAMP STIFFENER DESIGN FOR RAMP LOAD/UNLOAD DISC DRIVES, filed Jul. 17, 1997.

FIELD OF THE INVENTION

The present invention relates generally to the field of disc drive data storage devices, and more particularly but not by way of limitation, to a ramp loading apparatus for the protection of a disc drive from damage due to mechanical shock.

BACKGROUND

Modern disc drives are commonly used in a multitude of computer environments ranging from super computers through notebook computers to store large amounts of data in a form that can be made readily available to a user. Typically, a disc drive comprises one or more magnetic discs that are rotated by a spindle motor at a constant high speed. The surface of each disc is a data recording surface divided into a series of generally concentric data tracks, radially spaced across a band having an inner diameter and an outer diameter. Extending around the discs the data tracks store data within the radial extent of the tracks on the disc surfaces in the form of magnetic flux transitions, induced by an array of transducers or heads. Typically, each data track is divided into a number of data sectors that store fixed sized data blocks.

A read/write head includes an interactive element such as a magnetic transducer which senses the magnetic transitions on a selected data track to read the data stored on the track, or to transmit an electrical signal that induces magnetic transitions on the selected data track to write data to the track. The head includes a read/write gap that positions the active elements of the head at a position suitable for interaction with the magnetic transitions on the data tracks of a disc as the disc rotates.

As is known in the art, each head is mounted to a rotary actuator arm and is selectively positionable by the actuator arm over a pre-selected data track of the disc to either read data from or write data to the pre-selected data track. The head includes a slider assembly having an air bearing surface that causes the head to fly over the data tracks of the disc surface due to air currents caused by rotation of the disc.

Typically, multiple center open discs and spacer rings are alternately stacked on a spindle motor's hub. The hub, defining the core of the stack, serves to align the discs and spacer rings around a common centerline. Collectively the discs, spacer rings and spindle motor hub define a disc stack envelope. The surfaces of the stacked discs, forming a disc stack, are accessed by the heads mounted on a complementary stack of actuator arms which compose an actuator assembly, or "E-block". The E-block generally includes head wires which conduct electrical signals from the heads to a flex circuit, which in turn conducts the electrical signals to a flex circuit bracket mounted to a disc drive basedeck. For a general discussion of E-block assembly techniques, see U.S. Pat. No. 5,404,636 entitled METHOD OF ASSEMBLING A DISC DRIVE ACTUATOR, issued Apr. 11, 1995 to Stefansky et al., assigned to the assignee of the present invention.

A continuing trend in the industry is the reduction in size of modern disc drives. As a result, the discs in the disc stacks of modern disc drives are increasingly being brought closer together, providing narrower vertical gaps between adjacent discs. Although facilitating greater amounts of storage capacity, such narrow vertical spacing of the discs gives rise to a problem of increased sensitivity of the disc drives to non-operating mechanical shocks; particularly, predominant failure modes in modern disc drives have been found to include damage to the surfaces of the discs, damage to the sliders and load arms, and damage to the actuator arms as a result of contact between the actuator arms and the discs from mechanical shocks encountered during the shipping and handling of the drives. Computer modeling has shown that the first mechanical bending mode of the discs typically causes over fifty percent of the motion between the arms and discs in selected disc drive designs. The bending mode is generally dependent upon the material, diameter and thickness of the discs, and these factors are not readily modified in a disc drive design.

Additionally, as disc drives continue to decrease in size, smaller heads, thinner substraights, longer and thinner actuator arms, and thinner gimbal assemblies will continue to be incorporated into the drives, significantly increasing the need to protect the disc drives from damage as a result of incidental contact between actuator arm/gimbal assemblies and the surfaces of the discs.

Coupled with increased mechanical performance demands, imposed by designed size reductions of disc drives, are market requirements that demand ever increasing non-operating shock performance. In response to these demands alternative solutions have begun to emerge. Some sub drives with disc diameters of less than 95.0 millimeters (3.74 inches, commonly referred to as a standard "3.5 inch form factor") have met the demand through the use of ramp loading technology. The improved performance is obtained by eliminating head induced media damage through the removal of the heads from the discs. Ramp loading technology implementation is less demanding in sub 3.5 inch form factors, especially those with fewer discs. In designs using fewer discs of smaller diameter the ramp loading apparatus need not protrude over the disc surface or intrude into the space between the discs. However, an increase in disc diameter necessitates the need for the ramp loading apparatus to protrude over the disc surface or intrude into the space between the discs, as the load point remains inboard the disc outer diameter. Increasing the number of discs in the disc stack heightens the demands of maintaining the dimensional, mechanical and operational integrity of the ramp loading apparatus.

Attempts to extend the ramp material over the discs, while assuring non-interference with outer diameter read/write functions, necessitate a substantial reduction in the thickness of the ramps. Reductions in thickness sufficient to insure non-obstruction of drive function result in insufficient strength and rigidity in the ramps to withstand the forces encountered during the loading operation.

There is a need for an improved ramp loading apparatus for complex disc drives to reduce the susceptibility of damage to those disc drives as a result of non-operating mechanical shocks.

SUMMARY OF THE INVENTION

The present invention provides a ramp loading apparatus with ramp stiffening to reduce the deflection of the discs caused by the application of a mechanical shock to the disc drive.

In the preferred embodiment, a disc drive assembly has a basedeck on which is supported a spindle motor, a plurality of discs connected to the spindle motor for rotation about a common central axis, each of the discs having a data recording surface. An actuator assembly is supported by the basedeck and has a plurality of actuator arms controllably rotatable over, and radially extending adjacent to, the data recording surfaces of the discs. The actuator arms support read/write heads adjacent the data recording surfaces for reading data from, and writing data to, the recording surfaces.

A ramp loading apparatus is supported by the basedeck in proximity to the outer perimeters of the discs and has a body forming a plurality of loading ramps that extend radially over the outer portions of the data recording surfaces of the discs. Lift tab channels are associated with the loading ramps, and the loading ramps are positioned such that the read/write heads are moved along the loading ramps and the lift tab channels as the heads are lifted from the data recording surfaces when the actuator arms move the heads to a park position as the disc drive is placed in its non-operating mode. Ramp stiffeners interconnect the loading ramps and the body, bridging the lift tab channels along one side thereof to strengthen the loading ramps.

The body forms a plurality of disc snubbers and interposed disc clearance slots, and each of the disc clearance slots is disposed to receive the outer perimeter of one of the discs in clearing relation. The disc snubbers are positioned to extend to dampen deflection of the discs resulting from a mechanical shock applied to the disc drive.

The advantages and features of the present invention will be apparent from the following description when read in conjunction with the drawings and appended claims.

BRIEF DESCRIPTION OF THE DRAWINGS

FIG. 3 is a semi-detailed, diagrammatical representation of one of the heads with its gimbal and lift tab in relation to a disc and in relation to the loading ramp of the ramp loading apparatus of FIG. 1.

FIG. 4 is a view of one of the heads with its gimbal and lift tab in relation to a disc and in relation to the loading ramp of the ramp loading apparatus of FIG. 1.

DETAILED DESCRIPTION

Figure 1:
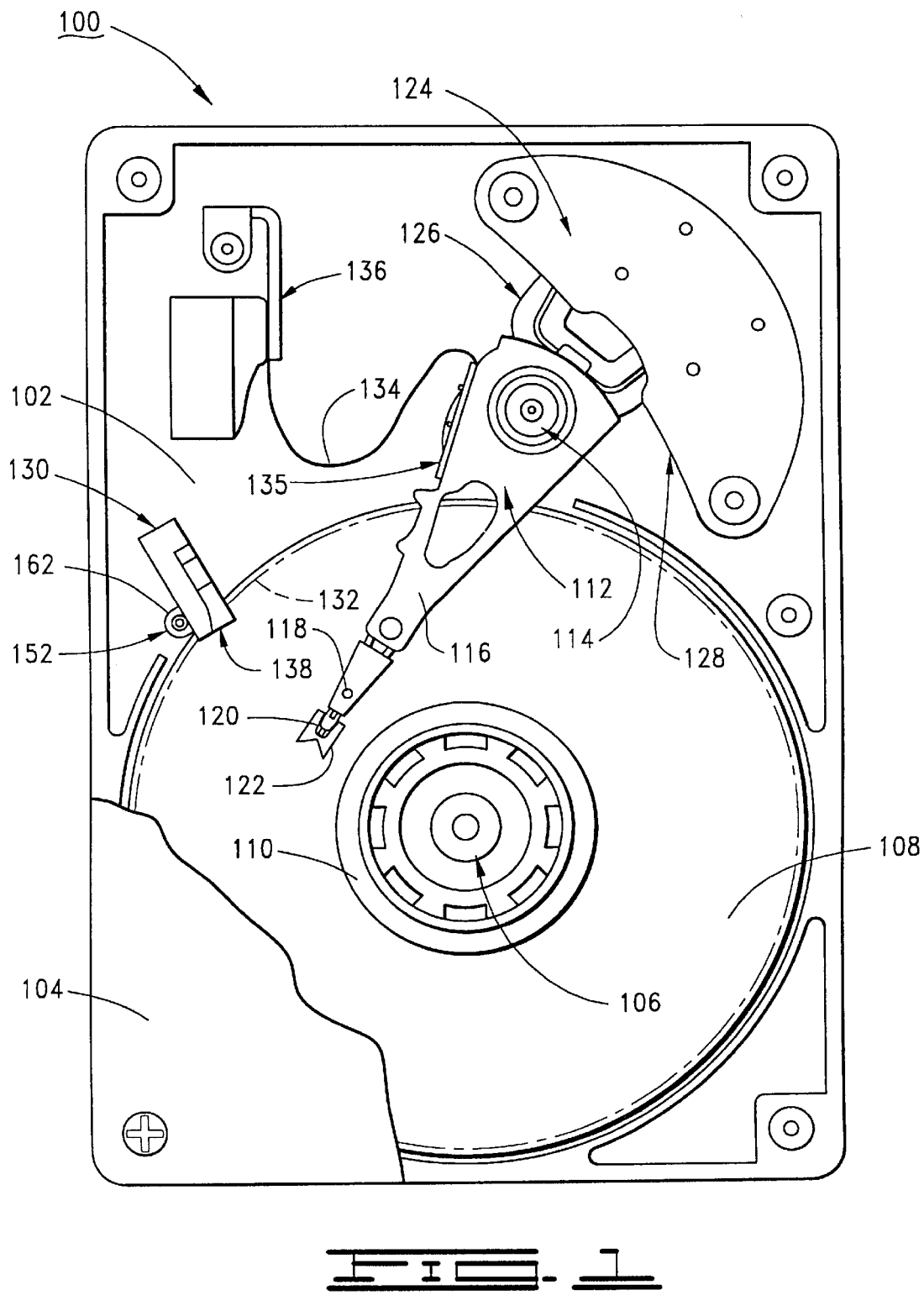
FIG. 1 is a top plan view of a disc drive constructed in accordance with the present invention.

Referring to the drawings in general, and more particularly to FIG. 1, shown therein is a top plan view of a disc drive 100 constructed in accordance with the present invention. The disc drive 100 includes a basedeck 102 to which various disc drive components are mounted, and a top cover 104, which together with the base deck 102, provides a sealed internal environment for the disc drive 100. The top cover 104 is shown in a partial cut-away fashion to expose selected components of interest. It will be understood that numerous details of construction of the disc drive 100 are not included in the following description as such are well known to those skilled in the art and are believed to be unnecessary for the purpose of describing the present invention.

Mounted to the basedeck 102 is a spindle motor 106 to which a plurality of discs 108 are mounted and secured by a clamp ring 110 for rotation at a constant high speed. Adjacent the discs 108 is an actuator assembly 112 (sometimes also referred to as an "E-block") which pivots about a pivot shaft bearing assembly 114 in a rotary fashion. The actuator assembly 112 includes actuator arms 116 (only one shown) that support load arm assemblies 118. The load arm assemblies 118 in turn support read/write heads 120 and lift tabs 122, with each of the heads 120 corresponding to a surface of one of the discs 108. As mentioned hereinabove, each of the discs 108 has a data recording surface divided into concentric circular data tracks, and the heads 120 are positionably located over data tracks to read data from, or write data to, the tracks.

The actuator assembly 112 is controllably positioned by way of a voice coil motor assembly (VCM) 124, comprising an actuator coil 126 immersed in the magnetic field generated by a permanent magnet 128. A magnetically permeable flux path (such as a steel plate) is mounted above the actuator coil 126 to complete the magnetic circuit of the VCM 124. When controlled current is passed through the actuator coil 126, an electromagnetic field is set up which interacts with the magnetic circuit of the VCM 124 to cause the actuator coil 126 to move relative to the permanent magnet 128 in accordance with the well-known Lorentz relationship. As the actuator coil 126 moves, the actuator assembly 112 pivots about the pivot shaft bearing assembly 114, causing the lift tabs 122 to move into, or out of, a ramp loading apparatus 130 and adjacently across the surfaces of the discs 108 thereby allowing the heads 120 to interact with the data tracks of the discs 108 including an outer most readable guard band track 132 located on discs 108.

To provide the requisite electrical conduction paths between the heads 120 and disc drive read/write circuitry (not shown), head wires (not separately shown) are routed on the actuator assembly 112 from the heads 120, along the load arm assemblies 118 and the actuator arms 116, to a flex circuit 134. The head wires are secured by way of a suitable soldering process to corresponding pads of a printed circuit board (PCB) 135 of the flex circuit 134. In turn, the flex circuit assembly 134 is connected to a flex circuit bracket 136 in a conventional manner, which in turn is connected through the basedeck 102 to a disc drive PCB (not shown) mounted to the underside of the basedeck 102. The disc drive PCB provides the disc drive read/write circuitry which controls the operation of the heads 120, as well as other interface and control circuitry for the disc drive 100.

Figure 2:
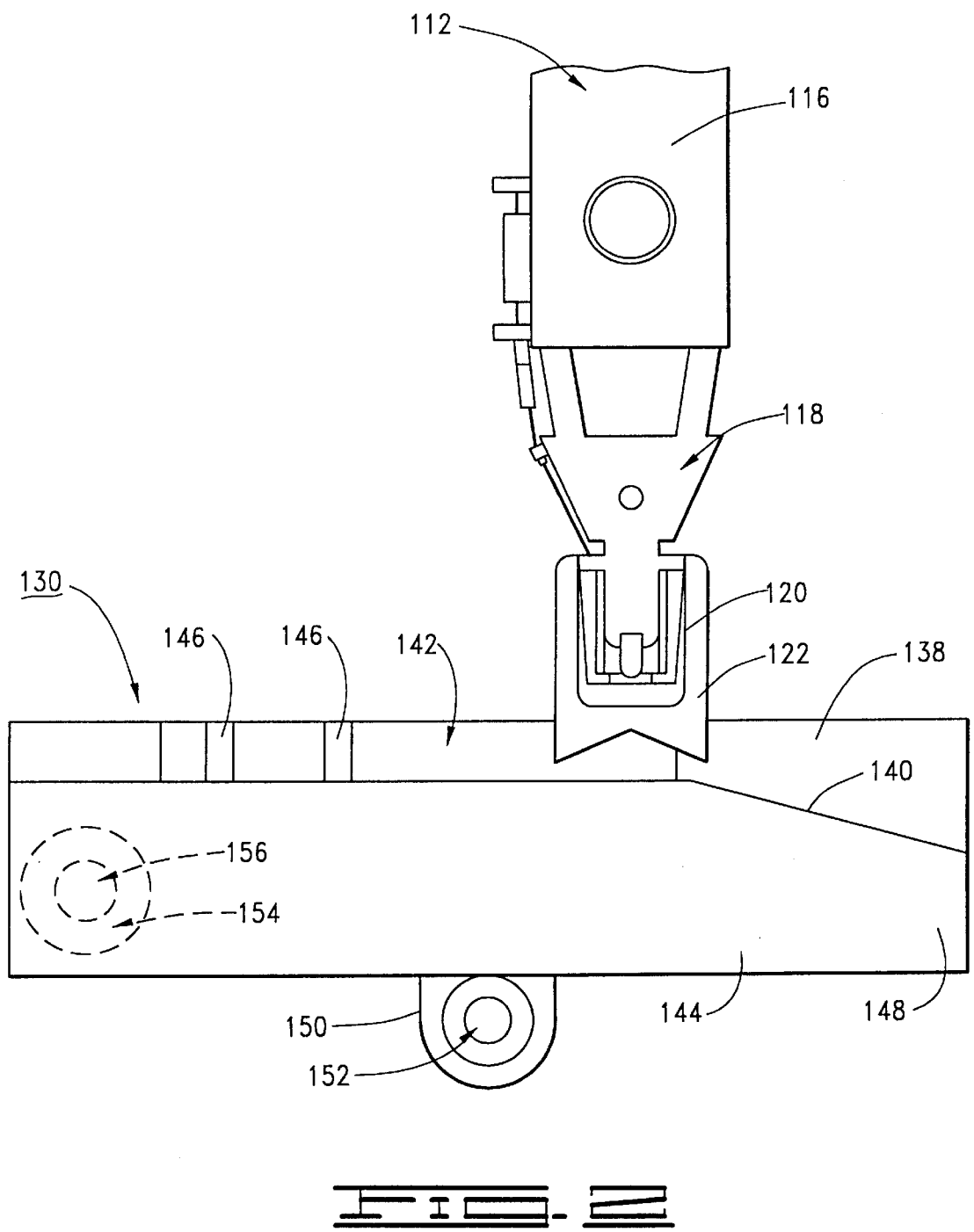
FIG. 2 is a cross-sectional view of the ramp loading apparatus of FIG. 1, and a portion of an actuator arm and a load arm assembly thereof.

FIG. 1 shows a ramp loading apparatus 130 supported by the basedeck 102 in proximity to the outer perimeters of the discs 108. At such time that the disc drive 100 is not in use, the heads 120 are moved to the outer perimeters of the discs 108, and as shown in FIG. 2, the heads 120 are caused to be lifted from the discs 108 by appropriately spaced loading ramps 138 of the ramp loading apparatus 130. The heads 120 are unloaded from the discs 108 when the lift tabs 122 come into contact with the loading ramps 138 and are moved up the loading ramps 138 by movement of the actuator arms 116. As mentioned above, the loading ramps 138 must be strengthened as the dimensions therebetween must decrease to accommodate decreased distances between the discs 108. Accordingly, the loading ramps 138 are joined by interposed ramp stiffeners 140, as best shown in FIG. 5 and 6 which will be discussed hereinbelow.

The ramp loading apparatus 130 has a plurality of lift tab channels 142 which separate the loading ramps 138 and extend into a main body 144 of the ramp loading apparatus 130, the ramp stiffeners 140 closing the lift channels 142 along one side thereof. The ramp stiffeners 140 act as a side wall, while the body 144 extends from the loading ramps 138 to form a bottom surface and an end wall so that the side wall, the bottom surface, and the end wall form a channel wherein two of the heads 120 may be secured thereupon. As the lift tabs 122 are moved up the loading ramps 138, the heads 120 come to rest in the lift tab channels 142 at a locked position. The loading ramps can optionally be provided with containment bumps or ridges 146, so that the heads 120 come to rest when the lift tabs 122 have moved past these locking containment ridges 146.

Figure 5:
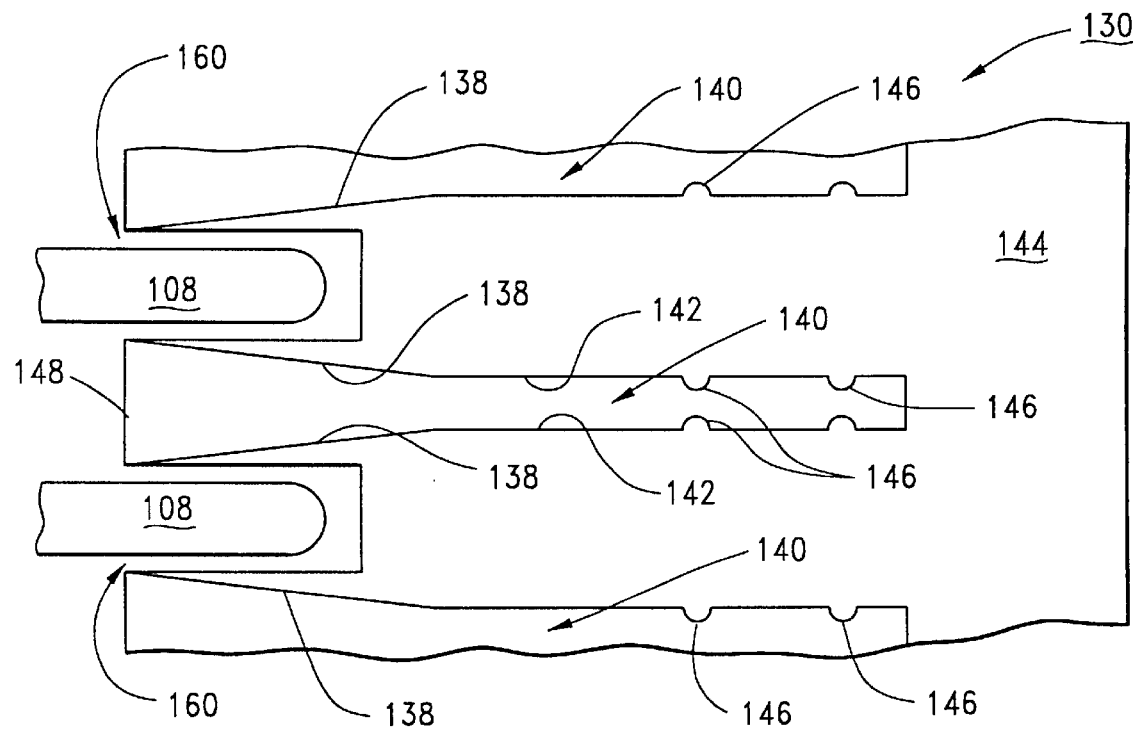
FIG. 5 is a side view of the ramp loading apparatus of FIG. 1.
Figure 6:
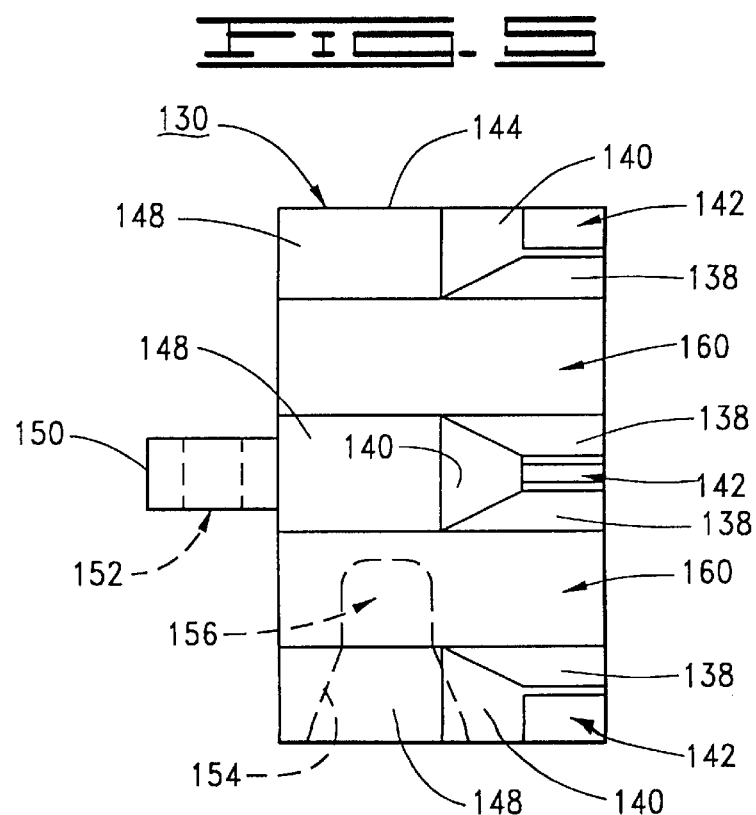
FIG. 6 is an end view of the ramp loading apparatus of FIG. 1.

As best shown in FIGS. 5 and 6, the body 144 forms a plurality of disc snubbers 148 at the receiving end of the ramp loading apparatus 130. That is, the ramp stiffeners 140 which span the lift tab channels 142 form the snubbers 148 that extend radially over the surface of the discs 108 and are disposed between the discs 108 as shown. That is, the disc snubbers 148 extend as the ends of the loading ramp stiffeners 140, and are of sufficient cross-sectional thickness and width to dampen contact between the actuator arms 116 and the surfaces of the discs 108 that can occur as a result of a mechanical shock applied to the disc drive 100.

Referring now to FIG. 2, shown therein is a portion of the actuator arm 116, the load arm assembly 118, the lift tab 122 and the head 120, all of which are components of the actuator assembly 112. The lift tab 122 is the portion of the actuator assembly 112 that contacts the ramp loading apparatus 130 when the heads 120 are either loaded onto, or unloaded from, the discs 108.

FIGS. 2 through 4 show the relationship between the lift tabs 122, the heads 120, the ramp loading apparatus 130 and the discs 108. FIG. 2 depicts the lift tab 122 in contact with the loading ramp 138 along the lift tab channel 142. Additionally, FIG. 2 illustrates the relative relationship between the ramp stiffener 140 and the loading ramp 138, the main body 144, the lift tab channel 142, the optimal containment ridges 146 and the lift tab 122. As shown in FIG. 2, the ramp loading apparatus 130 has a support or orientation tab or boss 150 which has an aperture 152 extending therethrough. Also, the ramp loading apparatus 130 has a self-centering alignment pin cavity comprising a lead-in chamfer 154 and a cavity 156.

FIG. 3 shows the relative relationship between the loading ramp 138, the lift tab 122, its associated gimbal 158, the read/write head 120 and the disc 108 wherein the read/write head 120 is located over the outer most readable guard band track 132 (not shown). FIG. 4 is another view which illustrates the relative relationship between the loading ramp 138, the lift tab 122, the gimbal 158, the read/write head 120 and the disc 108 wherein the read/write head 120 is located beyond the outer most readable guard band track 132 (not shown), and wherein the lift tab 122 is in contact with the loading ramp 138.

FIG. 5 is a side view of the ramp loading apparatus 130 showing the lift tab channels 142, the body 144, the ramp stiffeners 140, the loading ramps 138 and the containment ridges 146; also shown are disc clearance slots 160 between the disc snubbers 148, the dimensions of the disc clearance slots 160 being sufficiently large enough to permit the disc snubbers 148 to extend over the outer portions of the discs 108, the disc clearance slots 160 clearingly receiving the outer perimeters of the discs 108, as shown, during normal operation of the disc drive 100. The disc snubbers 148 are thereby in position relative to the discs 108 to dampen deflection of the discs 108 that can occur as a result of a mechanical shock applied to the disc drive 100.

FIG. 6 is a front view of the ramp loading apparatus 130 depicting the spatial relationship between the main body 144, the ramp stiffeners 140, the loading ramps 138 and the lift tab channels 142. Shown also are the ends of the disc snubbers 148 and the disc clearance slots 160 between them. Broken lines depict the self-centering alignment pin cavity comprising the lead-in chamfer 154 and the cavity 156. Also shown is the support boss 150, and broken lines depict the aperture 152.

Figure 7:
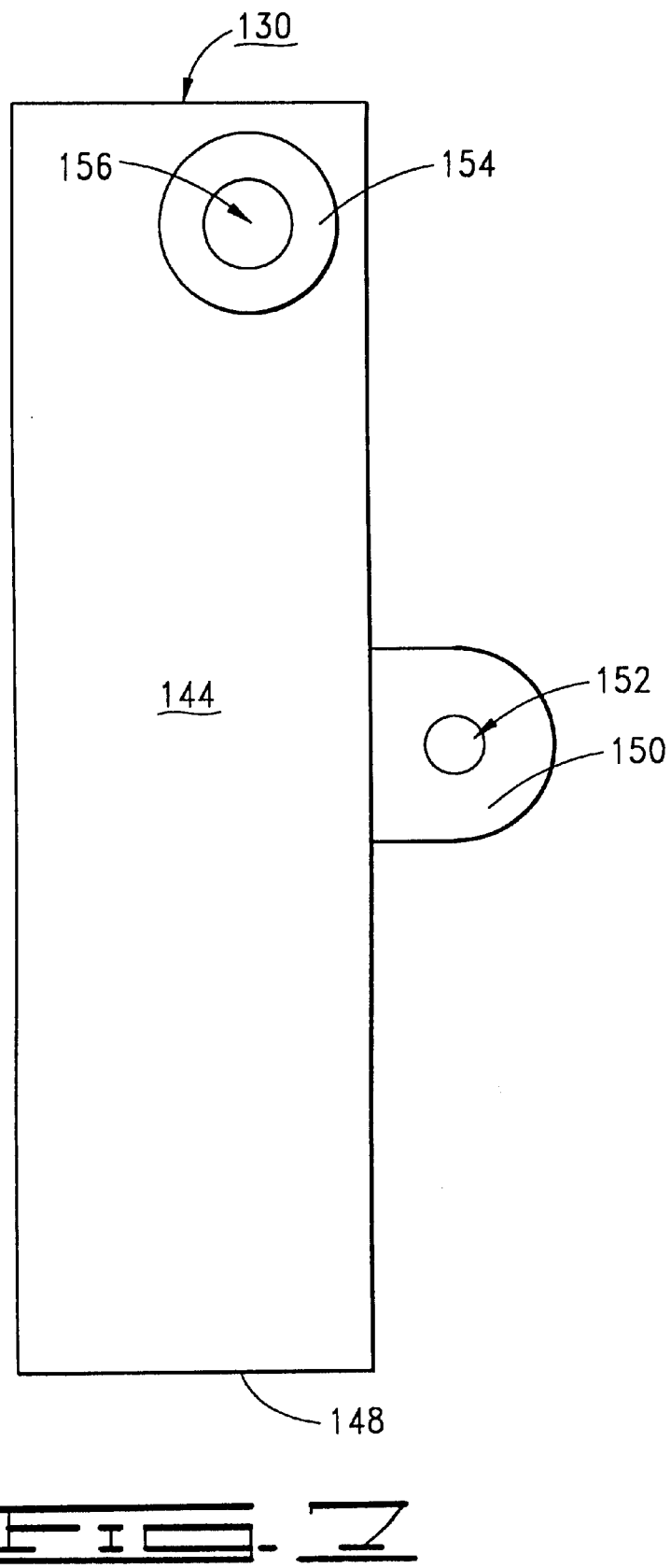
FIG. 7 is a bottom view of the ramp loading apparatus of FIG. 1.

FIG. 7 is a bottom view of the ramp loading apparatus 130 showing the spatial relationship between the main body 144; the self-centering alignment pin cavity comprising the lead-in chamfer 154 and the cavity 156; and the support boss 150 and the aperture 152.

The optimum placement of the ramp loading apparatus 130 will depend in part on the location of the actuator shaft bearing assembly 114 relative to the discs 108, as the ramp loading apparatus 130 should nominally be located within the radial extent of the lift tabs 122 in order to protect the disc drive 100 from damage. The location of the ramp loading apparatus 130 shown in FIG. 1 is provided for purpose of disclosure and is thus not limiting.

The ramp loading apparatus 130 is preferably formed from a non-marring material such as a polycarbonate, and it is sufficiently disposed to extend between the discs 108 to protect the disc drive 100 from damage without otherwise interfering with normal operation of the disc drive 100. The ramp loading apparatus 130 is preferably secured to the basedeck 102 by a threaded mounting bolt 162 (FIG. 1) which is threaded into a corresponding threaded aperture in the basedeck 102, but such methods as pressing, heat staking, crimping or sonic welding can also be used to mount the ramp loading apparatus 130 to the basedeck 102. As will be understood, an appropriately disposed locator pin (not shown) supported by the basedeck 102 and which is sized to be received into the cavity 156, together with the mounting bolt 162, will facilitate proper alignment of the ramp loading apparatus 130.

Other similar methodologies can be used to fabricate and assemble the ramp loading apparatus 130 into the disc drive 100. Additionally, although in the preferred embodiment generally flat surfaces are formed for the ramp loading apparatus 130, other contours and shapes can be used, including convex, concave, or shapes mocking an air foil.

The preferred embodiment of the present invention provides a ramp loading apparatus (such as 130) for a disc drive (such as 100), the disc drive having a basedeck (such as 102) which supports a spindle motor (such as 106) to which are connected a plurality of discs (such as 108) for rotation about a common central axis. Each of the discs has a data recording surface, and an actuator assembly (such as 112) supported by the basedeck for controlled rotation has a plurality of actuator arms (such as 116) that extend radially to support read/write heads (such as 120) adjacent the data recording surfaces.

The ramp loading apparatus, which is supported by the basedeck in proximity to the outer perimeters of the discs, has a body (such as 144) and a plurality of loading ramps (such as 138) which extend over the outer portions of the data recording surfaces of the discs. Also, the body has a plurality of lift tab channels (such as 142) communicating with the loading ramps, and the loading ramps are disposed to lift the read/write heads along the loading ramps and along the lift tab channels when the actuator arms move the heads to a park area as the disc drive is placed in its non-operating mode. Ramp stiffeners (such as 140) interconnect the loading ramps and the body of the ramp loading apparatus to strengthen the loading ramps. The body forms a plurality of disc snubbers (such as 148) with disc clearance slots (such as 160) interposed therebetween so that the disc clearance slots receive the outer perimeters of the discs therein, and the disc snubbers are positioned to dampen deflection of the discs from a mechanical shock applied to the disc drive.

It will be clear that the present invention is well adapted to carry out the objects and attain the ends and advantages mentioned as well as those inherent therein. Although the preferred embodiment described herein is directed to a ramp loading apparatus for a disc drive, it will be appreciated by those skilled in the art that the teachings of the present invention can be applied to other systems without departing from the scope and spirit of the present invention.

What is claimed is:

1. A disc drive assembly, comprising:
   a basedeck;
   a spindle motor supported by the basedeck;
   first and second discs connected to the spindle motor for rotation, the first and second discs having respective first and second, facing data recording surfaces;
   first and second read/write heads supported adjacent the data recording surfaces by an actuator assembly which controllably moves the first and second heads across the respective surfaces;
   a ramp loading apparatus supported by the basedeck in proximity to the outer perimeters of the discs, the ramp loading apparatus comprising:
      a body;
      a first loading ramp extending from the body and over an outer portion of the first disc;
      a second loading ramp extending from the body and over an outer portion of the second disc:
      a ramp stiffener disposed between the outer portions of the first and second discs and interconnecting the first and second loading ramps to form a three-surfaced channel through which the first and second heads pass as the heads are lifted from the respective data recording surfaces when the disc drive assembly is transitioned to the non-operational mode.

2. The disc drive assembly of claim 1 further comprising a disc snubber extending over the outer perimeters of the discs, the disc snubber dampening deflection of the discs effected as a result of a mechanical shock applied to the disc drive assembly.

3. The disc drive assembly of claim 1 wherein the ramp stiffeners are made of a polycarbonate material.

4. In a disc drive having a baseplate and having a plurality of actuator arms supporting read/write heads adjacent data recording surfaces of data discs, an improved ramp loading apparatus having a body and comprising:
   a plurality of loading ramps supported by the baseplate in proximity to the data recording surfaces of the discs, the loading ramps forming an enclosed channel to allow two heads to be secured therebetween on the body; and
   means for stiffening the loading ramps.

5. A method for parking a pair of adjacently disposed heads in a disc drive assembly, the heads characterized as first and second heads which access respective first and second, facing recording surfaces of first and second discs, the method comprising the steps of:
   (a) providing a ramp loading apparatus having a three-surfaced channel formed from first and second ramp surfaces and a stiffening side wall extending between outer portions of the first and second discs and interconnecting the first and second ramp surfaces; and
   (b) moving the first and second heads through the three-surfaced channel to a parked position as the disc drive assembly is transitioned to a non-operational mode, with the first and second heads being lifted from the corresponding recording surfaces by the first and second ramp surfaces, respectively.

6. The method of claim 5, wherein the ramp loading apparatus further operates as a disc snubber to limit deflection of each disc as a result of application of mechanical shock to the disc drive assembly.

7. The method of claim 5, wherein the providing step (a) further comprises a step of angling the first and second ramp surfaces toward each other, the first and second ramp surfaces each having a leading edge and a trailing edge, the leading edge angling to a point toward the plane of the disc and the trailing edge meeting the body so that the leading edge of the first ramp surface and the leading edge of the second ramp surface angle in opposite directions and toward the respective discs, while the trailing edge of the first ramp surface angles toward the trailing edge of the second ramp surface.

8. A disc drive assembly, comprising:
   a base deck;
   a spindle motor supported by the basedeck;
   first and second discs connected to the spindle motor for rotation, the first and second discs having respective first and second, facing data recording surfaces, the first and second discs adjacently aligned;
   first and second read/write heads supported adjacent the data recording surfaces by an actuator assembly which controllably moves the first and second heads from across the respective surfaces;
   a ramp loading apparatus supported by the basedeck in proximity to the outer perimeters of the discs, the ramp loading apparatus comprising:
      a body forming first and second arm portions extending outwardly toward the discs;
      a first ramp surface disposed between the adjacently aligned first and second discs in proximity to the first disc at a top position on the ramp loading apparatus, the first ramp surface having a leading edge and a trailing edge so that the leading edge converges to a point while angling upward toward the plane of the first disc and the trailing edge angles downward to meet the first arm portion of the body;
      a second ramp surface having a leading edge and a trailing edge, the second ramp surface disposed between the adjacently aligned first and second discs at a bottom position so that the leading edge converges to a point while angling downward toward the plane of the second disc and the trailing edge angles upward to meet the second arm portion of the body; and
      a ramp stiffener connecting the first and second ramp surfaces to provide a three walled chamber within which the first and second read/write heads are passed to converge to a parked position during the non-operational mode.

9. The disc drive assembly of claim 8 further comprising a disc snubber extending over the outer perimeters of the first and second discs, the disc snubber dampening deflection of the first and second discs effected as a result of a mechanical shock applied to the disc drive assembly.

10. The disc drive assembly of claim 8 wherein the ramp stiffener is made of a polycarbonate material.

* * * * *